US007561947B2

(12) United States Patent
Bonn et al.

(10) Patent No.: US 7,561,947 B2
(45) Date of Patent: Jul. 14, 2009

(54) DYNAMIC CMG ARRAY AND METHOD

(75) Inventors: J. Jeff Bonn, Glendale, AZ (US); Mason A. Peck, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1179 days.

(21) Appl. No.: 10/681,853

(22) Filed: Oct. 6, 2003

(65) Prior Publication Data
US 2005/0125111 A1  Jun. 9, 2005

(51) Int. Cl.
*B64G 1/36* (2006.01)
*G05D 1/00* (2006.01)
*G05D 3/00* (2006.01)
*G06D 7/00* (2006.01)
*G06F 17/00* (2006.01)

(52) U.S. Cl. .................. 701/13; 244/164; 244/165; 248/182.1; 74/5.1; 74/5.22; 74/5.34; 33/230

(58) Field of Classification Search .................. 701/13; 244/164, 165; 248/182.1; 74/5.1, 5.22, 5.34; 33/230
See application file for complete search history.

(56) References Cited

U.S. PATENT DOCUMENTS

| 3,111,038 | A | * | 11/1963 | Lewis, Jr. et al. ............. 74/5.1 |
| 3,452,948 | A | * | 7/1969 | Chang et al. ................ 244/165 |
| 5,261,631 | A | * | 11/1993 | Bender et al. ............... 244/165 |
| 6,039,290 | A | * | 3/2000 | Wie et al. ................... 244/165 |
| 6,128,556 | A | * | 10/2000 | Bailey ........................ 701/13 |
| 6,131,056 | A | * | 10/2000 | Bailey et al. ................ 701/13 |
| 6,154,691 | A | * | 11/2000 | Bailey ........................ 701/13 |
| 6,231,011 | B1 | * | 5/2001 | Chu et al. ................... 244/165 |
| 6,285,927 | B1 | * | 9/2001 | Li et al. ..................... 701/13 |
| 6,305,647 | B1 | * | 10/2001 | Defendini et al. ........... 244/165 |
| 6,311,931 | B1 | * | 11/2001 | Smay ......................... 244/164 |
| 6,350,996 | B1 | * | 2/2002 | Kawai et al. ................. 257/88 |
| 6,360,996 | B1 | | 3/2002 | Bockman et al. |
| 2002/0040950 | A1 | * | 4/2002 | Staley et al. ................ 244/165 |
| 2002/0145077 | A1 | * | 10/2002 | Shultz ........................ 244/79 |

OTHER PUBLICATIONS

PCT International Search Report PCT/US2004/032506, Jun. 26, 2006.

* cited by examiner

*Primary Examiner*—Khoi Tran
*Assistant Examiner*—Jorge O Peche
(74) *Attorney, Agent, or Firm*—Ingrassia Fisher & Lorenz, P.C.

(57) ABSTRACT

Methods and apparatus are provided for reorienting control moment gyros (CMGs) to compensate for CMG failure or change in spacecraft (S/C) mass properties or mission. An improved CMG comprises a drive means for rotating the CMG around an axis not parallel to the CMG gimbal axis. Releasable clamps lock the CMG to the spacecraft except during CMG array reorientation. CMGs arrays are combined with attitude sensors, a command module, memory for storing data and programs, CMG drivers and sensors (preferably for each CMG axis), and a controller coupling these elements. The method comprises determining whether a CMG has failed or the S/C properties or mission changed, identifying the working CMGs of the array, determining a new array reorientation for improved spacecraft control, unlocking, reorienting and relocking the CMGs in the array and updating the S/C control parameters for the new array orientation.

12 Claims, 7 Drawing Sheets

DYNAMIC CMG ARRAY AND METHOD

TECHNICAL FIELD

The present invention generally relates to systems for controlling spacecraft momentum, and more particularly to spacecraft systems employing multiple controlled moment gyros (CMGs).

BACKGROUND

It is well known in the art to use control moment gyros (CMGs) to control the momentum and adjust the orientation of spacecraft. CMGs and momentum control systems are described, for example, in Patents or Patent Publications: US-2002/0040950 A1 to Staley et al; U.S. Pat. No. 6,231,011 B1 to Chu et al; U.S. Pat. No. 6,154,691 to Bailey; U.S. Pat. No. 6,360,996 B1 to Bockman et al; U.S. Pat. No. 6,128,556 to Bailey; U.S. Pat. No. 6,131,056 to Bailey et al; U.S. Pat. No. 6,285,927 B1 to Rongsheng et al; U.S. Pat. No. 6,305,647 B1 to Defendini et al; U.S. Pat. No. 6,039,290 to Bong Wie et al; and U.S. Pat. No. 6,311,931 B1 to Smay. It is known to use CMG arrays to adjust the momentum of the spacecraft and/or vary its orientation in three dimensions.

A problem with prior art CMG arrays is that when one or more of the CMGs in the array fails, it is often difficult or impossible to continue controlling the spacecraft momentum and/or orientation using the remaining CMGs. Even if some control continues to be possible, the available momentum control space is generally much reduced because the orientation of the remaining CMGs is no longer optimal. (The momentum control space is the range of momentum values that can be achieved at any given time using the available CMG array). A further problem often encountered with spacecraft is that upon construction or arriving in orbit, the mass properties of the spacecraft are not exactly as initially predicted, and the CMG orientation initially set up is less than optimum for the actual mass properties after construction or in arrival orbit. A still further problem is that during the life of the spacecraft due, for example, to the expenditure of maneuvering fuel or other supplies or cargo released or captured, the mass properties of the spacecraft may change with time. Once again, an initial CMG array orientation may no longer provide the maximum momentum control space. Thus, a need continues to exist for a means and method for improving the reliability and capability of spacecraft momentum control with CMG arrays, in particular, being able to compensate in whole or in part for: (1) failure of one or more of the individual CMGs of an array, or (2) different or altered mass properties of the spacecraft after construction or launch, or (3) a combination thereof.

Accordingly, it is desirable to provide a means and method whereby one or more of the active CMGs of a spacecraft can be reoriented to maximize the attainable momentum control space. In addition, it is desirable that the reorientation be able to be performed either prior to launch and/or remotely in-orbit. Furthermore, other desirable features and characteristics of the present invention will become apparent from the subsequent detailed description and the appended claims, taken in conjunction with the accompanying drawings and the foregoing technical field and background.

BRIEF SUMMARY

Methods and apparatus are provided for reorienting control moment gyros (CMGs) in orbit to compensate for a CMG failure or a change in spacecraft (S/C) mass properties or mission. An improved CMG apparatus comprises a drive means for rotating the CMG around an axis not parallel to the CMG gimbal axis. A bearing is desirably provided between the CMG base and mount to facilitate rotation. Releasable clamps lock the CMG to the spacecraft except during CMG array reorientation. For spacecraft momentum control, a system is provided comprising an array of the improved CMGs, S/C attitude sensors, a S/C attitude command module, memory for storing data and programs, CMG drivers and sensors (preferably for each CMG axis), and a controller that couples and controls these elements. The method comprises determining whether a CMG of the array has failed or the S/C properties or mission changed, identifying the working CMGs of the array, determining a new array reorientation for improved spacecraft control, unlocking, reorienting and relocking one or more of the CMGs in the array and, desirably, updating the S/C control parameters for the new array orientation.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. The words "orthogonal" and "substantially orthogonal" are used herein in connection with the relative orientation of various rotation axes and/or vectors in three-dimensional (3-D) space. These words are intended to describe, merely by way of example, a preferred arrangement or embodiment and are not intended to be limiting. It is not necessary that the vectors or axes associated with the CMGs of the present invention be 90 degrees apart, merely that they not all be parallel.

Figure 1A:
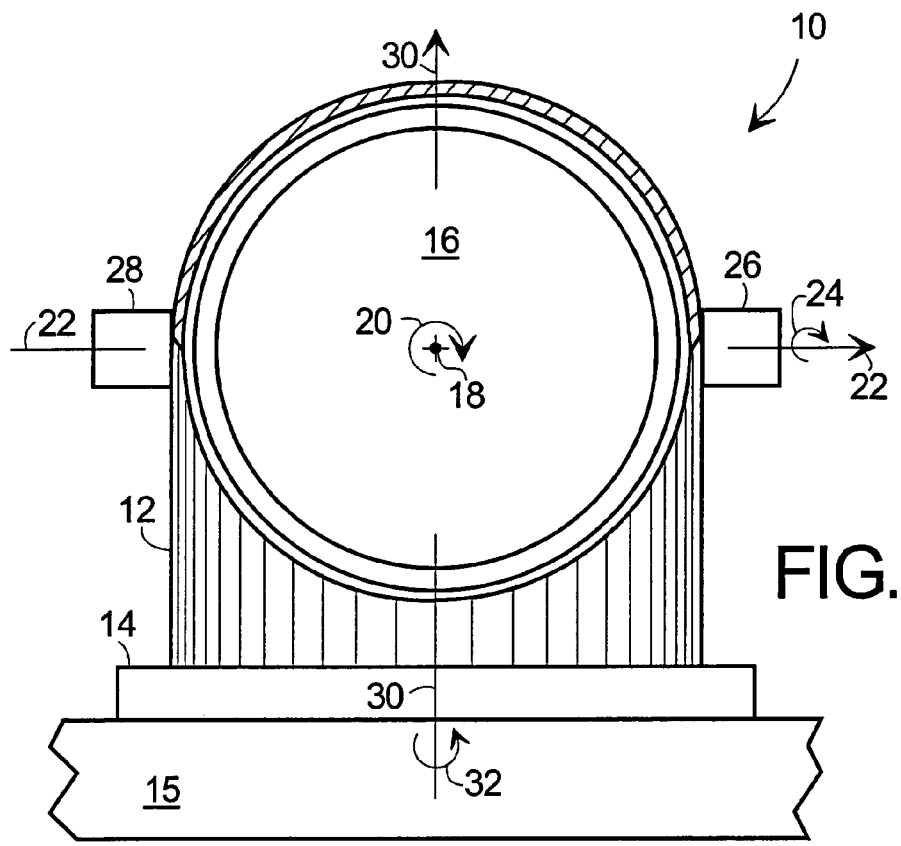
FIGS. 1A-1C are highly simplified, schematic, partially cut-away illustrations of a CMG of the present invention, FIGS. 1B-1C being at right angles to the view of FIG. 1A.
Figure 1B:
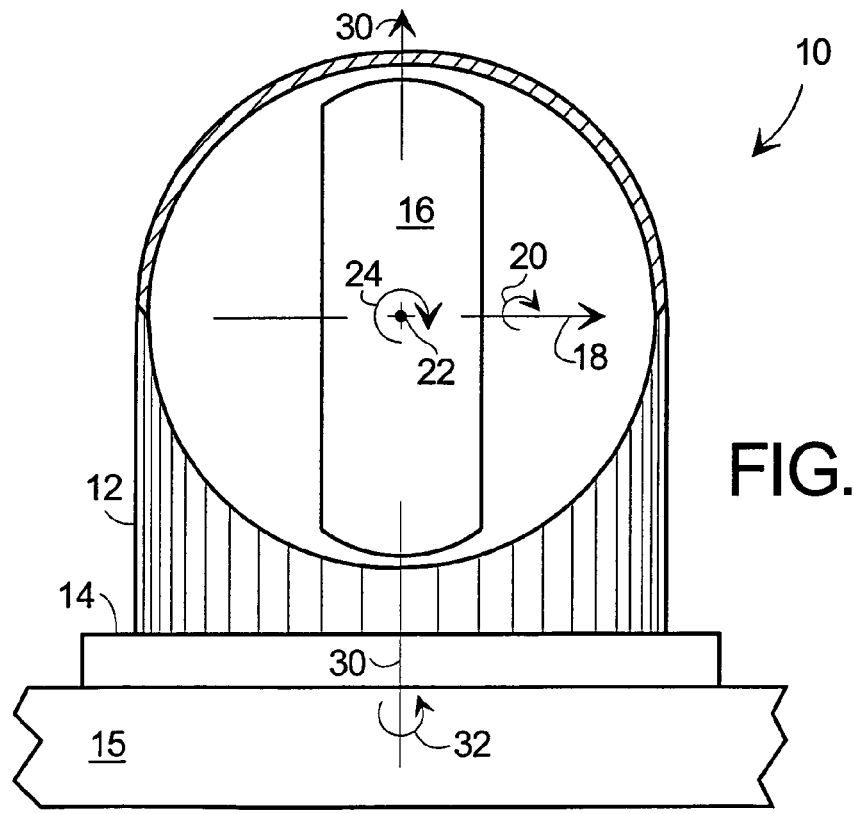
Figure 1C:
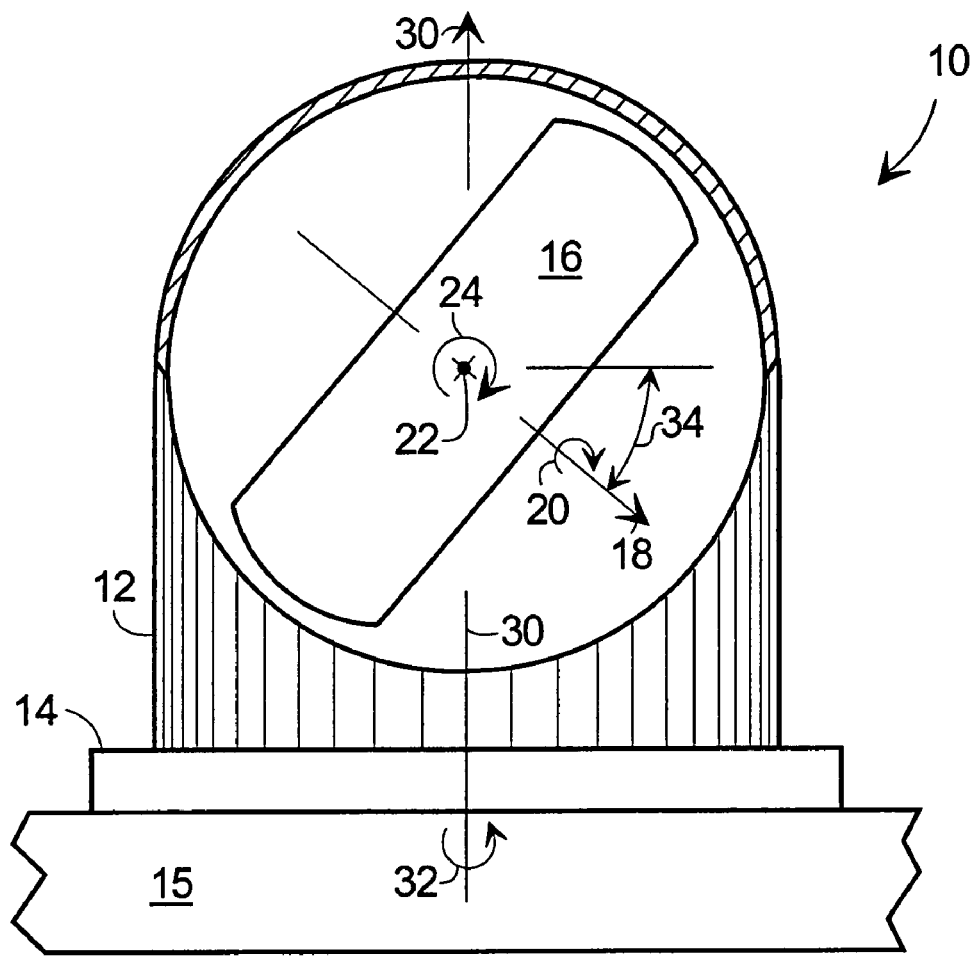

FIGS. 1A-1C are highly simplified partially cut-away schematic illustrations of CMG 10 according to the present invention. The internal elements of CMG 10 within housing 12 are conventional. FIG. 1A is a view of CMG 10 parallel to the plane of interior rotor 16. FIGS. 1B and 1C are views similar to FIG. 1A but at right angles to the view of FIG. 1A. Referring now to FIG. 1A, CMG 10 comprises exterior housing 12 attached via base 14 to mount 15. Mount 15 may be a portion of a spacecraft or a supporting base intended to be rigidly attached to a spacecraft (for simplicity a spacecraft is not shown in the figures). Within housing 12 is rotor 16. Rotor 16 is spinning, usually at high speed, about axis 18, as indicated by angular rotation arrow 20. The motor for rotating rotor 16 is conventional and has been omitted for simplicity. For convenience of description, axis 18 is identified as the direction vector of the angular momentum provided by rotor 16. Thus, the words "axis" 18 and "momentum vector" 18 are used interchangeably herein. Rotor 16 is supported on a gimbal (not shown) having axis of rotation 22 preferably but not essentially orthogonal to rotor axis 18 (axes 18 and 22 should not be parallel). Drive mechanism 26 is provided to rotate the gimbal supporting rotor 16 around axis 22 as shown by angular rotation arrow 24. Generally, position sensor 28 is provided to measure the amount of rotation of the gimbal by drive mechanism 26. Drive mechanism 26 and sensor 28 are conventional.

CMG 10 of the present invention has third rotational axis 30 preferably but not essentially orthogonal to axis 22. Axes 22, 30 can have any relative orientation as long as they are not parallel, but a substantially orthogonal arrangement is convenient. Since axis 18 can be moved by rotation around gimbal axis 22, axis 18 and 30 can be parallel under certain circumstances; hence that situation is not precluded. CMG 10 can be rotated about axis 30 as shown by angular rotation arrow 32. CMG 10 of the present invention differs from the prior art in that rotation about axis 30 can be performed in a controlled manner to compensate for changes in spacecraft mass properties, mission, payload or a CMG failure by unlocking it from the spacecraft or mount, reorienting it and relocking it after the controlled reorientation. Such reorientation can be performed before launch or in-orbit.

FIGS. 1B and 1C are views of CMG 10 at right angles to the view of FIG. 1A, that is, looking in along gimbal rotation axis 22. Rotor axis 18 now lies in the plane of the drawing. In FIG. 1B, gimbal rotation axis 22 is unchanged from the orientation in FIG. 1A. In FIG. 1C, rotor 16 has been rotated using its supporting gimbal (not shown) about axis 22 by angle 34 relative to its position in FIGS. 1A and 1B. Momentum vector 18 of rapidly spinning rotor 16 is now pointing in a different direction in an inertial frame. Since momentum is conserved in an inertial frame in the absence of externally applied moments, the change in orientation of CMG momentum vector 18 produces a corresponding change in the angular velocity of the spacecraft. Means and methods for calculating the change in angle 34 needed to achieve a given change in spacecraft orientation or momentum are known in the art.

Figure 2:
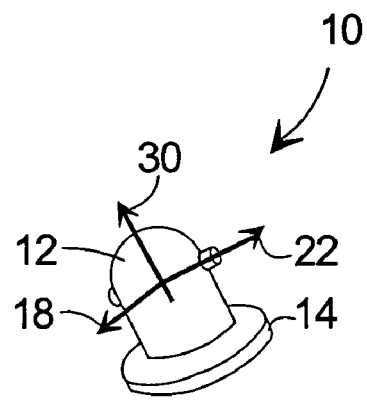
FIG. 2 is a simplified schematic view of a CMG of the present invention illustrating the generally orthogonal rotational vectors associated therewith.
Figure 3A:
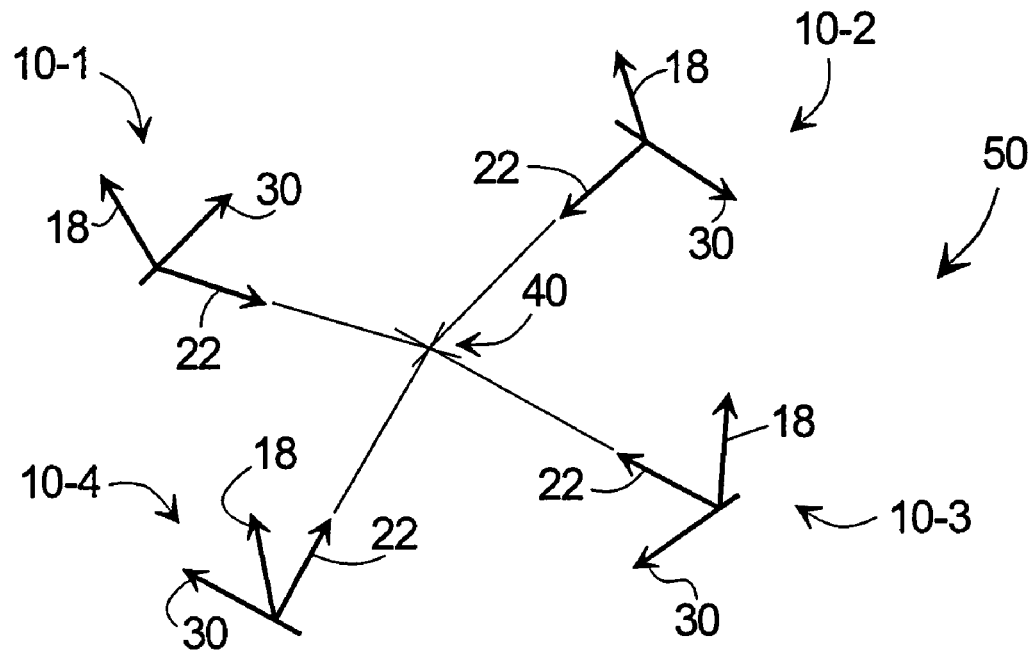
FIGS. 3A-B are simplified schematic views of the generally orthogonal rotational vectors of an array of CMGs used for momentum control of a spacecraft according to the present invention.

FIG. 2 is a simplified schematic view of CMG 10 of the present invention illustrating the substantially orthogonal rotation vectors 18, 22, 30 associated therewith. While vectors 18, 22, 30 are shown in FIGS. 2-3 as intersecting at a common point and being separated by approximately 90 degrees this is merely for convenience of explanation and not intended to be limiting. It is only necessary that vectors 22, 30 not be parallel, so that they have some orthogonal components. It is generally preferred to employ multiple CMGs, referred to as a CMG array. FIG. 3A is a simplified schematic view of CMG array 50 composed of four individual CMGs 10-1, 10-2, 10-3, 10-4. More or fewer CMGs can also be used, but four is often preferred. Three CMGs are the minimum needed to control all three spacecraft rotational degrees of freedom. Four CMGs are the minimum needed to offer redundancy in the event of a single CMG failure and still maintain three axes of control. The orientations of CMGs 10-1, 10-2, 10-3, 10-4 are indicated by their respective basis vectors or coordinate axes 18, 22, 30. Arrays similar to CMG array 50 are conveniently used for momentum control of spacecraft. Conventionally, CMGs 10-1 through 10-4 are rigidly attached to mount 15. In a typical prior art embodiment, point 40 forms the apex of a four-sided pyramid with each CMG lying along a side of the pyramid but this is not essential. Additional spare CMGs can be added to increase the system's ability to continue to function properly after CMG failures. The present invention does not depend upon the number of spare CMGs provided. For convenience of explanation, it is assumed herein that there are initially at least N=4 CMGs in the original CMG array but this is not essential since N=3 CMGs are sufficient for 3-axis spacecraft control. There can be more than four but not less than three for full 3-axis control. The present invention is useful where N≧4 and it is desired to compensate for a CMG failure and also useful where N≧3 and it is desired to compensate for changes in spacecraft properties or mission, or any combination thereof.

Figure 3B:
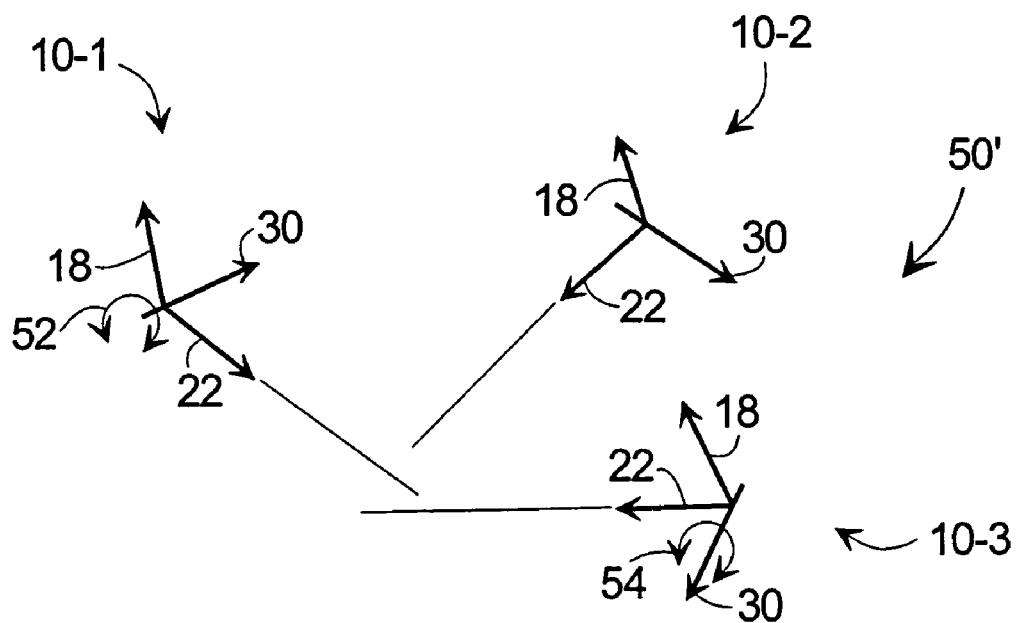

While the arrangement of FIG. 3A is useful when all four of the CMGs are active if one (or more if N>4) CMG fails, the remaining CMGs of array 50 of FIG. 3A likely no longer have the optimum orientation to provide the maximum momentum control space. Similarly, if the desired orientation of the CMGs established prior to construction or launch turns out to no longer provide the maximum momentum control space, then a means for reorienting one or more of the CMGs after construction or launch is desirable. FIG. 3B is a view similar to FIG. 3A but: (i) after CMG 10-4, for example, has failed, and (ii) where CMGs 10-1 and 10-3 have been rotated around their individual axes 30 by rotation angles 52, 54 respectively, to maximize the remaining momentum control space. CMG 10-2 may also be rotated about its axis 30 by rotation angle 56, but for purposes of this example it is assumed that rotation angle 56 equals zero. However, the specifics of this example are not critical. Angles 52, 54, 56 by which remaining CMGs 10-1, 10-2, and/or 10-3 may (or may not) be rotated so as to maximize the momentum control space for any spacecraft maneuvers desired to be performed, are calculated by CMG control electronics system 100 shown in FIG. 6 or received from ground control or otherwise. Angles 52, 54, 56 are determined based upon the known physical parameters of the spacecraft, the magnitude and direction of the momentum vectors of the remaining CMGs and the amounts and angles by which the remaining CMG momentum vectors may be changed. The present invention makes it possible to reorient the CMGs even when there is no CMG failure but the CMG array orientation needs to be changed to compensate for unexpected or changed spacecraft mass properties or mission or other anomalies. The changes may be calculated by on-board system 100 or equivalent, or remotely directed from ground control or other supervisory authority.

Figure 4A:
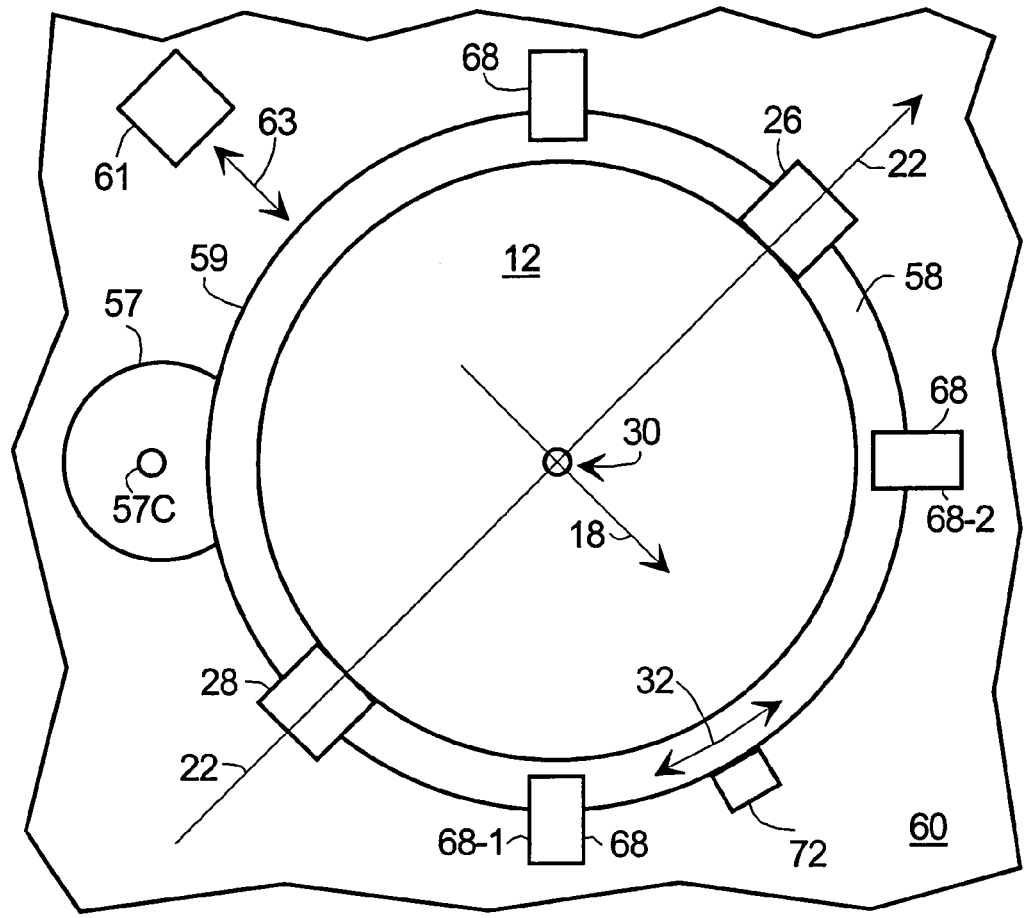
FIGS. 4A-B are plan and partially cut-away side views, respectively, of a CMG of the present invention showing how it attaches to a spacecraft, according to a first embodiment.
Figure 4B:
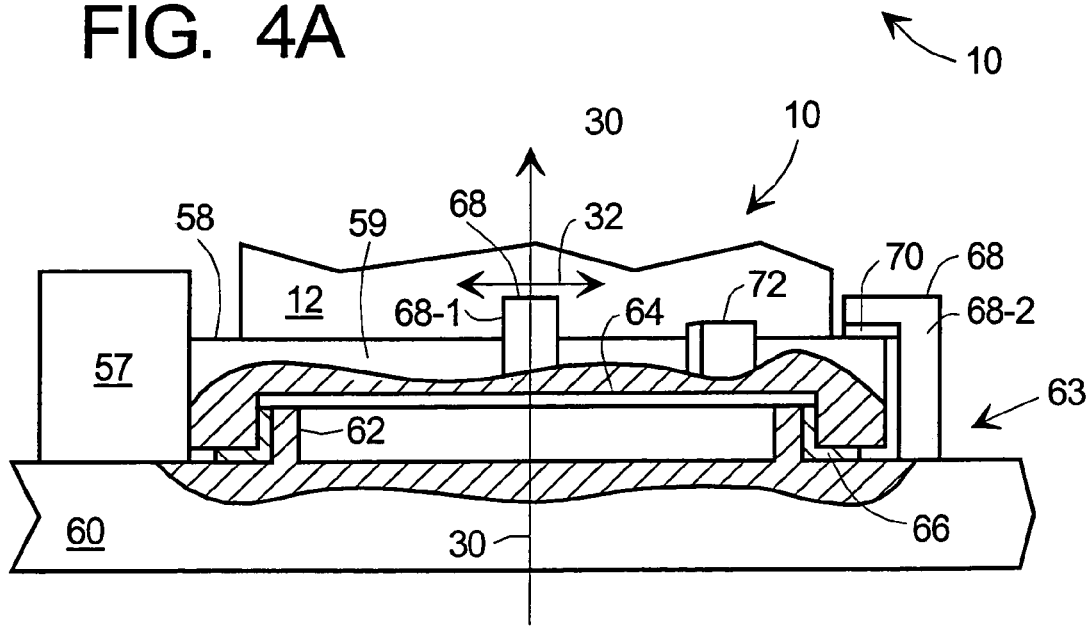

FIG. 4A is a plan view and FIG. 4B is a partial cross-sectional side view of CMG 10 of the present invention, showing further details of how it is mounted to the spacecraft, according to a first embodiment. CMG 10 of FIGS. 4A-4B has housing 12 coupled to base 58 analogous to base 14 of FIGS. 1A-1C. Base 58 is supported by mount 60 analogous to mount 15 of FIGS. 1A-1C. Mount 60 may be a portion of a spacecraft or a supporting base intended to be rigidly attached to a spacecraft. Base 58 and mount 60 are coupled by rotationally moveable joint 63, preferably but not essentially having a center of rotation coincident with axis 30, so that housing 12 containing rotor 16 and gimbal axis 22 (see FIG. 1A-1C) may be rotated by angle 32 with respect to spacecraft portion 60. As previously noted, it is preferable that axis 30 is substantially orthogonal to gimbal angle vector 22 but this is not essential. It is only essential that it not be parallel thereto. Base 58 is conveniently but not essentially rotated with respect to mount 60 by motor or other actuator 57 attached to mount 60. Any means of coupling actuator 57 and base 58 may be used. For example, and not intended to be limiting, outer rim 59 of base 58 may be provided with gear teeth (not shown) that engage a pinion (not shown) rotating about center 57C of actuator 57, or alternatively a pulley and belt arrangement may also be used or alternatively, actuator 57 and base 58 may be magnetically coupled as in a direct drive arrangement. Persons of skill in the art will understand that the use of actuator 57 is merely exemplary; any means of inducing relative rotational motion between base 58 and mount 60 around axis 30 (or an axis parallel to axis 30) may be used. Angle sensor 61 is desirably provided to measure the amount of rotation angle 32 that has been provided. Sensor 61 may be a non-contact sensor utilizing light beam 63 to read index marks on base 58 or housing 12, but this is merely by way of example and not intended to be limiting. Any means of measuring the magnitude of rotational angle 32 may be used. The foregoing arrangements are capable of providing small or large, continuous or discrete, CMG rotations around axis 30. As used herein the phrase "around axis 30" or the like having to do with rotation of a CMG with respect to axis 30 is intended to include rotation around any axis parallel to axis 30.

Referring now to FIG. 4B, moveable joint 63 comprises annular raised portion 62 on mount 60, annular recessed portion 64 in base 58 and bearing material 66 therebetween to facilitate relative motion of base 58 (and therefore of CMG 10) with respect to mount 60. One or more retainers 68 coupled to mount 60 desirably overlap base 58 to prevent base 58 (and CMG 10) from separating from mount 60. Low friction bearing material 70 is desirably placed between retainer 68 and base 58 to facilitate relative motion thereof. Stop lug 72 is optionally provided on base 58 to limit or determine the maximum amount of rotation angle 32, but this is not essential. In one direction stop lug 72 engages retainer 68-1 and in the other direction retainer 68-2. While retainers 68 conveniently provide stops for limiting rotation of base 58, this is not essential and any means of limiting maximum rotation of base 58 with respect to mount 60 may be used when desirable. It is not necessary to limit the rotation, but may be convenient depending upon the needs of the user.

Figure 5A:
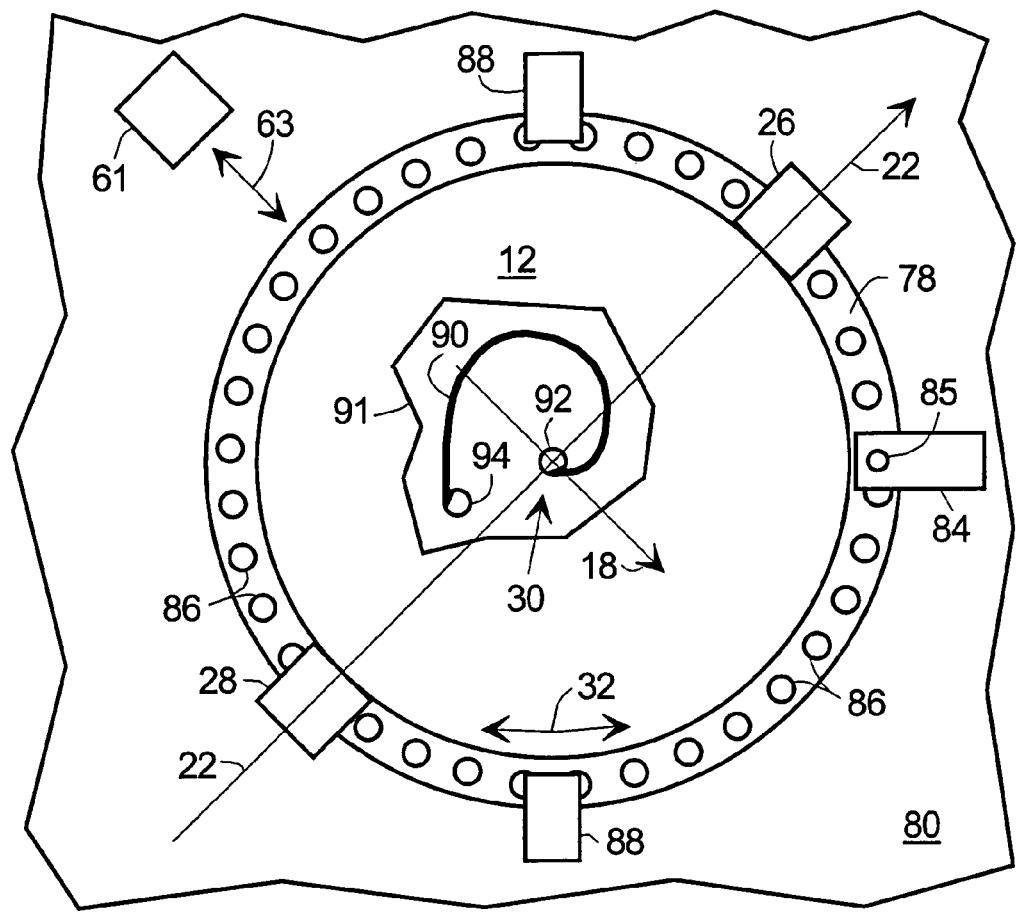
FIGS. 5A-B are plan and side views, respectively, both partially cut-away, of a CMG of the present invention showing how it attaches to a spacecraft, according to a further embodiment.
Figure 5B:
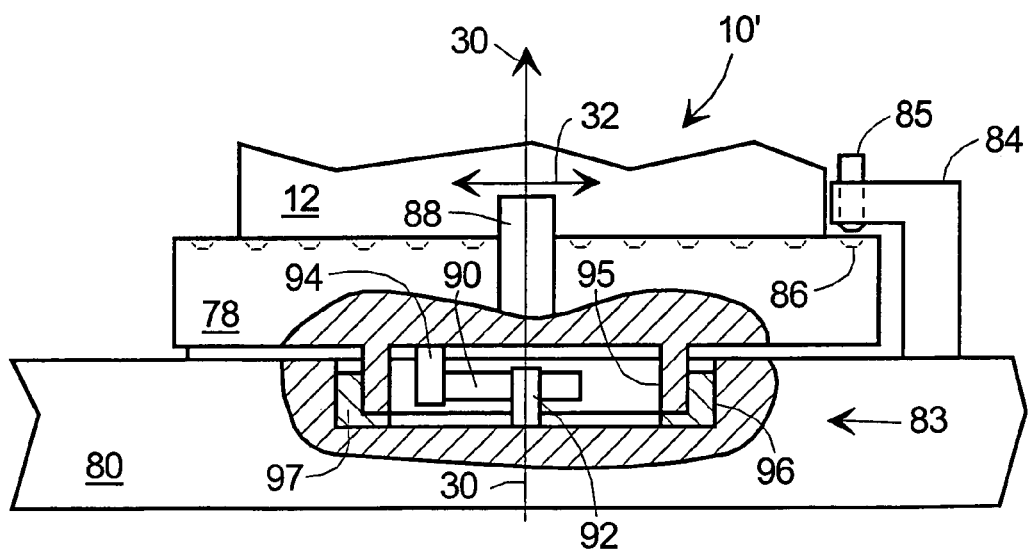

FIG. 5A is a partial cross-sectional plan view and FIG. 5B is a partial cross-sectional side view of CMG 10' according to another embodiment of the present invention. FIGS. 5A-5B are analogous to FIGS. 4A-4B. CMG 10' has housing 12 coupled to base 78 analogous to base 14 of FIGS. 1A-1C and base 58 of FIGS. 4A-4B. Base 78 is supported by mount 80 analogous to mount 15 of FIGS. 1A-1C and mount 60 of FIGS. 4A-4B. Base 78 and mount 80 are coupled by rotationally moveable joint 83, preferably but not essentially having a center of rotation coincident with axis 30, so that housing 12 containing rotor 16 (see FIG. 1A-LC) and gimbal axis 22 may be rotated by angle 32 with respect to mount 80. As previously noted, it is preferable that axis 30 is orthogonal to gimbal angle vector 22 or at least have an orthogonal component (i.e., not be parallel). Rotationally movable joint 83 conveniently comprises annular protrusion 95 from base 78 that penetrates into recess 96 in mount 80, thereby engaging annular shaped bearing material 97 located between the two. Moveable joint 83 of FIGS. 5A-5B is the geometric inverse of moveable joint 63 of FIGS. 4A-4B. Retainers 88 analogous to retainers 68 of FIGS. 4A-4B are conveniently provided to prevent base 78 from separating from mount 80. While two examples have been provided here for moveable joints between the CMG base and the mount that is a part of or attached to the spacecraft, this is merely for convenience of explanation, and persons of skill in the art will understand that any means of providing relative rotation, translation or a combination thereof, can be used.

Referring now to FIG. 5B and to the details revealed through cut-out 91 in FIG. 5A, upwardly extending post 92 is fixed to mount 80 within annular recess 96. Post 92 is conveniently but not essential located coincident with axis 30. Fixed to base 78 within annular protrusion 95 is downwardly extending post 94, conveniently but not essentially offset from post 92. Force member 90 couples posts 92, 94. Force member 90 may be, for example, a spring or a bimetallic expansion-contraction strip or other motive means. For a spring, base 78 can be rotated so as to tension or wind-up spring 90 when base 78 is initially fixed to mount 80, e.g., prior to launch, and then held in cocked position by locking mechanism 84 and/or other retractable clamps (not shown). For example, locking mechanism 84 has moveable locking pin 85 that conveniently engages detents 86 is base 78. Locking pin 85 may be moved magnetically or by any other convenient means. If during flight it is desired to rotate CMG 10' with respect to the spacecraft, then locking pin 85 is retracted to allow base 78 to turn relative to mount 80 in response to the force exerted by spring 90. However, this is merely by way of illustration and not intended to be limiting. Any means of rotating base 78 with respect to mount 80 may be used and the rotation may be continuous or in discrete steps or a combination thereof, according to the needs of the user. In addition to or in place of rotation, CMG 10, 10' may also be translated relative to its initial mounting location. Any means of providing translation may be used, provided that the mechanism includes clamps for locking the CMG in place after the translation. A non-limiting example is a track on mount 15, 60, 80 or the underlying spacecraft structure, that is engaged by grooves or flanges on corresponding CMG base 14, 58, 78 (or vice-versa), wherein the grooves or flanges can move along the track.

Force member 90 may be a bimetallic strip that bends in response to heating caused, for example, by conducting an electric current or a nearby heater (not shown). Changing the temperature of bimetallic strip force member 90 causes it to curl or uncurl, thereby rotating base 78 with respect to spacecraft portion 80. Any other means for causing relative rotation of base 78 with respect to mount 80 can also be used. A useful method of actuation is using the torque of the CMG itself to provide a rotational force. Using the torque of the CMG itself also applies to the arrangement of FIGS. 4A-B.

In FIGS. 5A-5B, locking pin 85 is shown in the retracted position thereby allowing base 78 to rotate with respect to mount 80 as shown by angle arrows 32. When locking pin 85 is released, it drops down onto base 78 and stops rotation of base 78 as the next detent 86 passes beneath locking pin 85. This provides positive indexing of the relative rotation of base 78 and mount 80. By pulsing locking mechanism 84 so that locking pin retracts and resets, rotation may be advanced in increments determined by the circumferential spacing of detents 86. Alternatively a gear and pinion or belt or magnetic drive such as is illustrated in FIGS. 4A-B may also be used to provide continuous or indexed movement.

Figure 6:
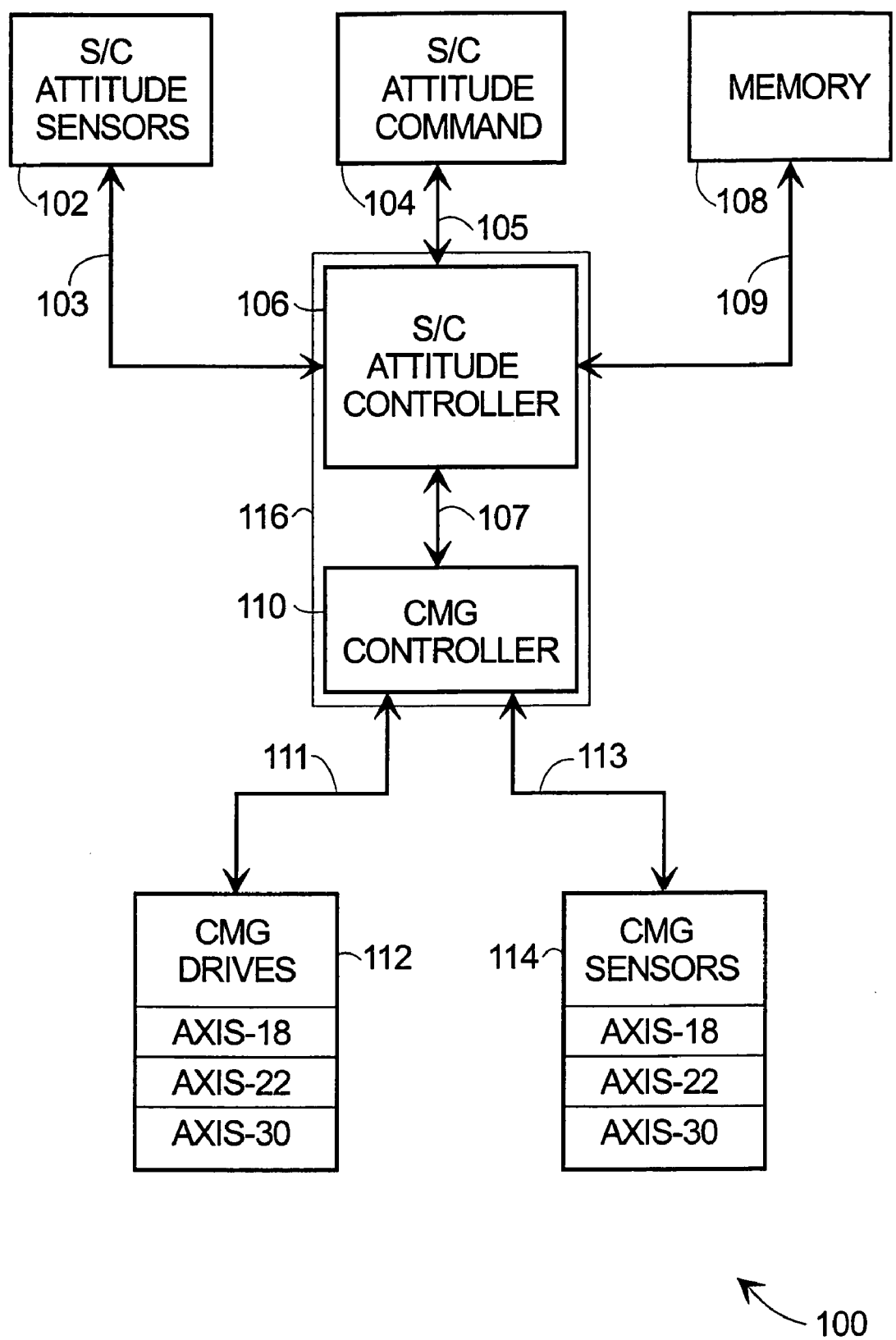
FIG. 6 is a simplified electrical schematic block diagram of a spacecraft momentum control system according to the present invention.

FIG. 6 is a simplified electrical schematic block diagram of spacecraft control system 100 according to the present invention. System 100 comprises spacecraft (abbreviated "S/C") attitude sensors 102 (e.g., inertial, gyros, star trackers, etc.), spacecraft attitude command module 104 wherein desired changes in spacecraft attitude may be received from ground control or the overall spacecraft management system or some other supervisory authority (not shown), spacecraft attitude controller 106, memory 108 and CMG controller 110. Attitude sensors 102 are coupled to controller 106 by bus or leads 103. Attitude command module 104 is coupled to controller 106 by bus or leads 105. Memory 108 is coupled to controller 106 via bus or leads 109. Memory 108 stores control programs for controller 106, spacecraft properties, CMG properties, CMG array configuration and/or other reference information that controllers 106 and/or 110 may require. Persons of skill in the art will understand what information is needed for their particular system and how to store such information in memory 108. CMG controller 110 is coupled to S/C attitude controller 106 by bus or leads 107. While the arrangement shown in FIG. 6 having S/C attitude controller 106 and CMG controller 110 is preferred, they may be combined as indicated by outline 116 encompassing both. For convenience of explanation, the combination within outline 116 is referred to as 'controller' 116. For the purposes of this invention it does matter whether controller 116 is partitioned into S/C attitude controller 106 and CMG controller 110 or not so long as the desired functions for controlling CMGs 10, 10' are provided.

System 100 further comprises CMG drives 112 and CMG sensors 114, coupled to controller 110 by bus or leads 111 and 113 respectively. CMG drives 112 and sensors 114 are coupled to or part of CMGs 10, 10' (see FIGS. 1-5) of array 50, 50' or equivalent, intended to be used for momentum control of the spacecraft to which they are attached. CMGs 10, 10' include CMG drives 112 (e.g., motors or other motive power) desirably for each of axes 18, 22, 30, but especially for unlocking, reorienting about axis 30 and relocking the CMG. Similarly, in the preferred embodiment (but not essentially), CMGs 10, 10' include CMG sensors 114 which measure the state of rotation about each of axes 18, 22, 30, for example, the speed of rotation of rotor 16 around axis 18, angle 24 of gimbal rotation around axis 22 and angle 32 of base rotation around axis 30. In the preferred embodiment, axes 18, 22, 30 are shown as being substantially orthogonal, but this is merely for convenience of explanation and is not essential. As has been previously explained, it is only necessary that axis 22 not be parallel to axis 30. Axis 18 may have any orientation with respect to axis 30.

During ordinary S/C attitude control operations, when the input received from S/C attitude sensors 104 differs from the desired attitude command received from attitude command module 104, then based on the spacecraft properties and the CMG array information stored in memory 108 and the axes orientation information received from CMG sensors 114 (which may also be stored in memory 108), controller 116 can calculate the amount of drive to be supplied to CMG drives 112 for each CMG for each axis, to reorient the spacecraft to the attitude described by attitude command module 104. In the course of performing this calculation, controller 116 can also check to insure that the desired orientation requested by attitude command module 104 is within the available momentum control space, but this is not essential. Alternatively, controller 116 can retrieve some or all of a predetermined CMG reorientation plan from memory 108 without having to perform the entire corrective calculations itself. Still further, the above-noted calculation can be performed remotely (e.g., by ground control or other supervisory authority) and transmitted to the spacecraft and system 100 via interface 104 so that controller 116 can send the desired reorientation signals (e.g., via CMG controller 110) to CMG drives 112. Any of these arrangements is useful. It does not matter how or where the signals needed to reorient CMG array 50, 50' are determined. It only matters that system 100 be capable of providing the appropriate signals to CMG drives 112 to unlock one or more of the CMGs, cause the desired reorientation of the unlocked CMGs and then relock these CMGs in the new orientation.

In addition to performing these routine S/C attitude control operations described above, in the preferred embodiment controller 116 can continually or periodically monitor the individual CMGs in CMG array 50, 50' (see FIGS. 3A-3B), e.g., via CMG controller 110, drives 112 and/or sensors 114 to determine whether or not any CMG has failed. For a particular CMG to be considered operational it should continue to provided a determinable rotor spin speed around axis 18, a determinable gimbal rate and gimbal position around axis 22, a determinable orientation and rotation capability around axis 30, and continue to communicate with controller 110 via buses or leads 111, 113 or equivalent. Controller 110 conveniently interrogates CMG drives 112 and sensors 114 to verify proper operation. When controller 116 detects that a CMG has failed then, as is explained more fully in connection with FIG. 7, it determines the amount and direction by which the remaining CMGs should be reoriented to maximize the momentum control space, and CMG controller 110 issues commands to drives 112 of the remaining active CMGs to achieve this event. The amount and direction of reorientation may be calculated by controller 116 or obtained from memory 108 or obtained from a supervisory authority such as S/C ground control and/or other system, or a combination thereof. In the preferred embodiment, controller 110 also monitors CMG sensors 114 to determine that the desired reorientations have been carried out.

In addition to reorienting individual members of the CMG array to compensate for a failed CMG, system 100 can also operate to reorient CMG array 50, 50' to maximize the momentum control space when the spacecraft mass properties are different from what had been predicted prior to launch or what has changed with time in orbit. Attitude reorientation commands issued by attitude command module 104 can direct such reorientation based on commands received from ground control or controller 116 can be directed to calculate the optimum CMG array orientation for a new set of S/C parameters or predetermined repositioning instructions. Different mass and orientation scenarios stored in memory 108 may also be used. Any suitable means of obtaining the revised CMG array orientations is useful. Information about the state of the spacecraft provided by sensors 102 or other spacecraft instruments may also be used to optimize the reorientation maneuver. Controller 116 then causes drives 112 to carry out the desired CMG array reorientation. Algorithms for determining the proper CMG array orientation for particular S/C mass properties and/or orientations are well known in the art. Alternatively, the number of CMGs and the direction of their gimbal axes can be varied until the optimal fit of the momentum capability envelope to the S/C orientation or momentum requirements is found; optimal in the sense that the least momentum per CMG is needed for S/C control. The CMGs and their associated locks can be released, reoriented and relocked individually or in groups, or combinations thereof.

Figure 7:
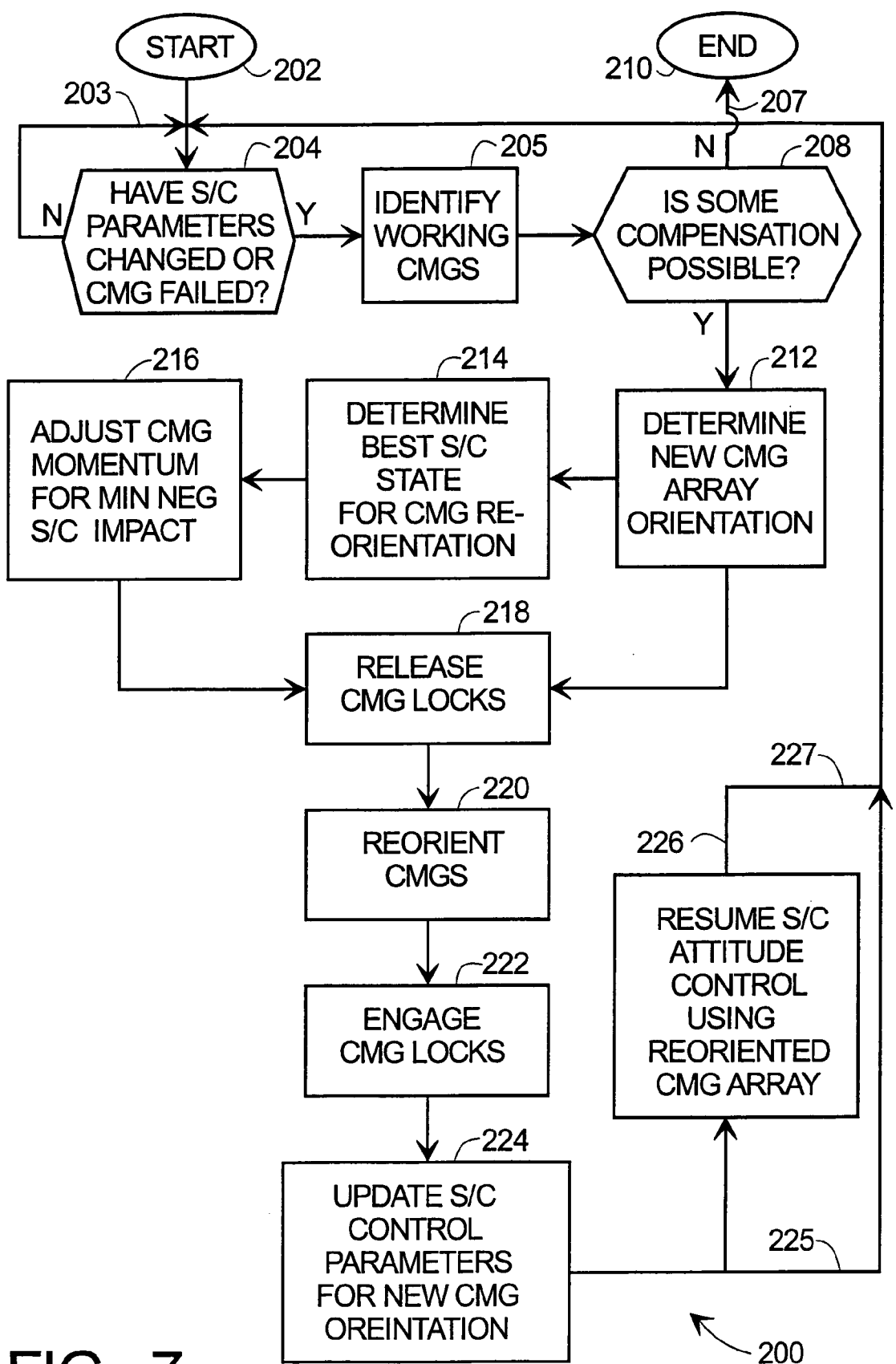
FIG. 7 is a simplified flow chart illustrating the method of the present invention.

FIG. 7 is a simplified flow chart illustrating method 200 of the present invention. Method 200 begins with start 202 that is conveniently initiated on system power-up. Query 204 ("HAVE S/C PARAMETERS CHANGED OR CMG FAILED?) is performed wherein controller 116 and/or sub-controllers 106 and/or 110 or equivalent determines whether information received, for example, via command module 104 indicates that the S/C mass parameters or S/C mission has changed (e.g., from the values stored in memory 108), or whether a CMG has failed. If the outcome of query 204 is NO (FALSE) then method 200 loops back to start 202 via path 203 and query 204 is repeated. If the outcome of query 204 is YES (TRUE) then method 200 proceeds to step 205 (IDENTIFY WORKING CMGs) wherein it is determined which CMGs of the array are working properly. Then query 208 (IS SOME COMPENSATION POSSIBLE?) is optionally executed. Step 208 is desirable but not essential. If the outcome of query 208 is NO (FALSE) indicating that no compensation can made, then method 200 proceeds to END 210 via path 207. If the outcome of query 208 is YES (TRUE) then method 200 proceeds to step 212 (DETERMINE NEW CMG ARRAY ORIENTATION) wherein controller 116 or equivalent calculates or otherwise determines or obtains a revised CMG orientation to maximize the possible momentum control space. Persons of skill in the art will understand how to perform such calculation or have system 100 request such information from ground control (or a ground control computer) or retrieve it from memory 108 (or other memory) where an appropriate pre-planned response is available, or in other appropriate ways.

In a first embodiment of the method of the present invention, step 212 is optionally followed by steps 214, 216. In step 214 (DETERMINE BEST S/C STATE FOR CMG RE-ORIENTATION) controller 116 or equivalent obtains or determines what state the spacecraft should be in so that reorientation of the CMG array can occur with minimum negative impact on the S/C. For example, it may be desirable to activate on-board thrusters to cause an otherwise directionally stable S/C to spin temporarily so that no solar radiation hotspots develop during reorientation. Alternatively, the S/C attitude may need to be different during CMG reorientation, for example, to insure that radiators intended to cool the S/C do not unintentionally end up pointed at the sun. Persons of skill in the art will understand what factors and circumstances should be considered depending upon the properties and needs of their particular spacecraft and how to accomplish appropriate adjustments. In step 216 (ADJUST CMG MOMENTUM FOR MIN NEG S/C STATE IMPACT) commands are sent to drivers 112 or equivalent to adjust, for example, the rotational speed of rotor 16 or other CMG parameters so that the CMG array reorientation has minimum negative impact on the spacecraft state during the change. However steps 214, 216 are not essential and method 200 may proceed directly from step 212 to step 218 or via steps 214, 216, according to the needs and desires of the user.

In step 218 (RELEASE CMG LOCKS), one or more locks or other mechanism previously restraining rotation of CMGs 10, 10' around, for example, axis 30 (or an axis parallel to axis 30) are released. In step 220 (REORIENT CMGS) one or more of CMGs 10, 10' are reoriented (e.g., see FIGS. 3A-3B) by controller 110 and drives 112 by the amount calculated or obtained by controller 106 or equivalent, to maximize the available momentum space. In step 222 (ENGAGE CMG LOCKS) the one or more CMG locks or mechanisms are re-engaged to once again fix CMGs 10, 10' to their respective mounts or space craft portions, but in the new orientation. In step 224 (UPDATE S/C CONTROL PARAMETERS FOR NEW CMG ORIENTATION) the control parameters stored CONTROL USING REORIENTED CMG ARRAY) indicates that system 100 can once again routinely use the modified CMG array to control spacecraft orientation. Method 200 returns to start 202 via path 225 (before step 226) or path 227 (after step 226), according to the needs of the user. The CMGs and their associated locks can be released, reoriented and relocked individually or in groups, or combinations thereof.

While at least one exemplary embodiment has been presented in the foregoing detailed description, it should be appreciated that a vast number of variations exist. For example, while the reorientation of the CMGs of the present invention has been generally described for individual CMGs, this is merely for convenience of explanation and not intended to be limiting. Persons of skill in the art will understand that multiple CMGs can be coupled to the same mount and moved collectively by reorienting the collective mount, and that the appended claims are intended to include this variation. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A control moment gyro (CMG) for use in a space vehicle, comprising:
    a rotor adapted to rotate around a first CMG axis;
    a gimbal supporting the rotor wherein the gimbal is able to rotate around a second CMG axis not parallel with the first axis;
    a mount adapted to be rigidly coupled to the space vehicle;
    a base supporting the gimbal wherein the base is able to rotate around a third axis not parallel with the second axis, the base coupled to the mount and rotatable relative thereto;
    a plurality of detents formed in the base;
    a locking pin fixedly coupled to the mount, the locking pin for locking and unlocking the base by selectively engaging different ones of plurality of detents; and
    a drive mechanism coupled to the base for causing the base to rotate around the third axis when unlocked.

2. The CMG of claim 1 wherein the plurality of detents is formed in an outer circumferential portion of the base such that each detent in the plurality of detents passes by the locking pin as the base is rotated relative to the mount.

3. An apparatus for controlling spacecraft (S/C) momentum using control moment gyros (CMGs), comprising:
    a CMG array including at least first, second, and third CMGs, the first CMG in the CMG array comprising:
        rotor adapted to rotate around a first axis;
        a gimbal supporting the rotor wherein the gimbal is able to rotate around a second axis not parallel to the first axis;
        a mount adapted to be rigidly coupled to the S/C;
        a base supporting the gimbal and rotor and able to rotate around a third axis not parallel to the second axis, the base coupled to the mount and rotatable relative thereto, the base including a plurality of mechanical locking features;
        locking pin fixedly coupled to the mount, the locking pin for locking and unlocking the base by selectively engaging different ones of plurality of mechanical, locking features; and
        a drive coupled to the base for causing the base to rotate around the third axis when unlocked; and
    a controller coupled to the drive and to the pin for selectively locking, unlocking, and rotating the first CMG about the third axis to reorient the CMG array.

4. The apparatus of claim 3 wherein the first CMG is a single gimbal axis CMG.

5. The apparatus of claim 3 wherein the drive causes rotation of the first CMG around the third axis and translation of the first CMG with respect to the S/C.

6. The apparatus of claim 3 wherein the drive is rotationally coupled between the S/C and the base of the first CMG so as to provide rotation of the base around the third axis.

7. The apparatus of claim 3 wherein the first CMG further comprises a bearing coupled between the S/C and the base facilitating relative movement thereof.

8. The apparatus of claim 3 further comprising one or more sensors coupled to the first CMG and the controller for determining the amount of relative movement of the base of the first CMG with respect to the S/C.

9. The apparatus of claim 3 further comprising one or more sensors coupled to the S/C and to the controller for measuring one or more aspects of the S/C condition or attitude.

10. The apparatus of claim 9 further comprising a memory coupled to the controller for storing one or more parameters concerning a state of the first CMG.

11. The apparatus of claim 3 wherein the controller comprises a S/C attitude controller and a CMG controller.

12. The apparatus of claim 3 further comprising:

one or more sensors coupled to the first CMG and the controller for determining the amount of rotation of the first CMG about the third axis;

one or more sensors coupled to the S/C and to the controller for measuring one or more aspects of the S/C condition or attitude; and memory coupled to the controller for storing data concerning the first CMG.

* * * * *